US008554016B2

(12) United States Patent
Manson

(10) Patent No.: US 8,554,016 B2
(45) Date of Patent: Oct. 8, 2013

(54) IMAGE REGISTRATION SYSTEM AND METHOD FOR REGISTERING IMAGES FOR DEFORMABLE SURFACES

(75) Inventor: Steven James Manson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 422 days.

(21) Appl. No.: 12/943,156

(22) Filed: Nov. 10, 2010

(65) Prior Publication Data

US 2012/0114202 A1    May 10, 2012

(51) Int. Cl.
*G06K 9/32* (2006.01)

(52) U.S. Cl.
USPC .......................................... 382/294; 382/128

(58) Field of Classification Search
USPC .................. 382/128–132, 294–296
See application file for complete search history.

(56) References Cited

U.S. PATENT DOCUMENTS

| 4,276,570 | A   | * | 6/1981  | Burson et al. ................. 382/276 |
| 6,173,275 | B1  |   | 1/2001  | Caid et al. |
| 6,628,805 | B1  |   | 9/2003  | Hansen |
| 6,959,119 | B2  |   | 10/2005 | Hawkins et al. |
| 7,162,063 | B1  | * | 1/2007  | Craine et al. ................. 382/128 |
| 7,574,031 | B2  | * | 8/2009  | Dehmeshki ................... 382/131 |
| 7,657,101 | B2  |   | 2/2010  | Christiansen, II et al. |
| 8,194,952 | B2  |   | 6/2012  | Mertz et al. |
| 2004/0012638 | A1 |   | 1/2004  | Donnelli et al. |
| 2004/0093166 | A1 |   | 5/2004  | Kil |
| 2004/0161141 | A1 |   | 8/2004  | Dewaele |
| 2004/0217962 | A1 | * | 11/2004 | Lewis et al. ................... 345/506 |
| 2005/0180657 | A1 | * | 8/2005  | Zhang et al. .................. 382/294 |
| 2005/0190980 | A1 |   | 9/2005  | Bright |
| 2005/0232474 | A1 |   | 10/2005 | Wei et al. |
| 2006/0002632 | A1 |   | 1/2006  | Fu et al. |
| 2006/0120620 | A1 | * | 6/2006  | Bassi et al. .................... 382/276 |
| 2006/0153431 | A1 | * | 7/2006  | Ando ............................ 382/124 |
| 2006/0227385 | A1 |   | 10/2006 | Kawada |
| 2006/0291708 | A1 |   | 12/2006 | Dehmeshki et al. |
| 2007/0064989 | A1 | * | 3/2007  | Chhibber et al. ............. 382/128 |
| 2007/0182762 | A1 | * | 8/2007  | Wu et al. ....................... 345/647 |

(Continued)

FOREIGN PATENT DOCUMENTS

| WO | WO-2009148596 A1 | 12/2009 |
| WO | WO-2009158001 A1 | 12/2009 |
| WO | WO-2012/064400 A1 | 5/2012 |

OTHER PUBLICATIONS

U.S. Appl. No. 12/147,081, Preliminary Amendment filed Sep. 29, 2008, 10 pgs.

(Continued)

*Primary Examiner* — Jingge Wu
(74) *Attorney, Agent, or Firm* — Schwegman Lundberg & Woessner, P.A.

(57) ABSTRACT

Embodiments of an image registration system and method registering corresponding images of a deformable surface are generally described herein. In some embodiments, image features of the corresponding images are converted to point features, the point features from each corresponding image are sorted based on one or more attributes of the point features, and a plurality of three-point sets are generated for each image from a selected portion of the sorted point features. Each three-point set defines a triangle. Matching triangles may be identified from the corresponding images. The corresponding point features of the matching triangles represent corresponding image features providing for at least local image registration.

23 Claims, 7 Drawing Sheets

(56) References Cited

U.S. PATENT DOCUMENTS

| | | | |
|---|---|---|---|
| 2009/0010509 A1* | 1/2009 | Zhou et al. | 382/128 |
| 2009/0196475 A1* | 8/2009 | Demirli et al. | 382/128 |
| 2009/0304243 A1 | 12/2009 | Mertz et al. | |
| 2009/0327890 A1 | 12/2009 | Mertz et al. | |
| 2010/0111387 A1 | 5/2010 | Christiansen, II et al. | |
| 2010/0291912 A1 | 11/2010 | Tafarrodi et al. | |

OTHER PUBLICATIONS

International Application Serial No. PCT/US2009/003386, Search Report mailed Aug. 4, 2009, 3 pgs.

International Application Serial No. PCT/US2009/003386, Written Opinion mailed Aug. 4, 2009, 7 pgs.

International Application Serial No. PCT/US2009/003773, Search Report mailed Aug. 12, 2009, 2 pgs.

International Application Serial No. PCT/US2009/003773, Written Opinion mailed Aug. 12, 2009, 6 pgs.

U.S. Appl. No. 12/133,163 Notice of Aliowance maiied Feb. 9, 2012, 11 pgs.

U.S. Appl. No. 12/133,163, Response filed Nov. 23, 2011 to Non Final Office Action mailed Sep. 26, 2011, 17 pgs.

U.S. Appl. No. 12/133,163, Non Final Office Action mailed Sep. 26, 2011, 10 pgs.

International Serial No. PCT/US2011/51182, International Search Report mailed Jan. 26, 2012, 2 pgs.

International Serial No. PCT/US2011/51182, Written Opinion mailed Jan. 26, 2012, 6 pgs.

* cited by examiner

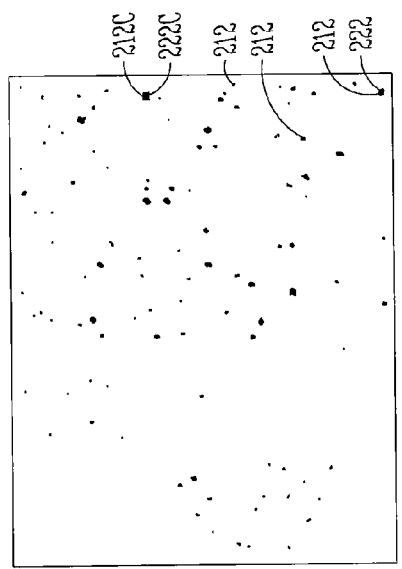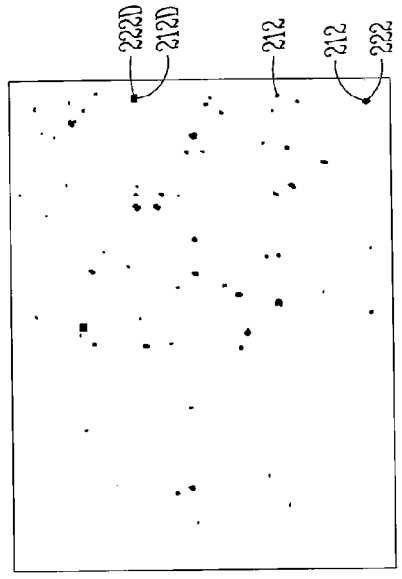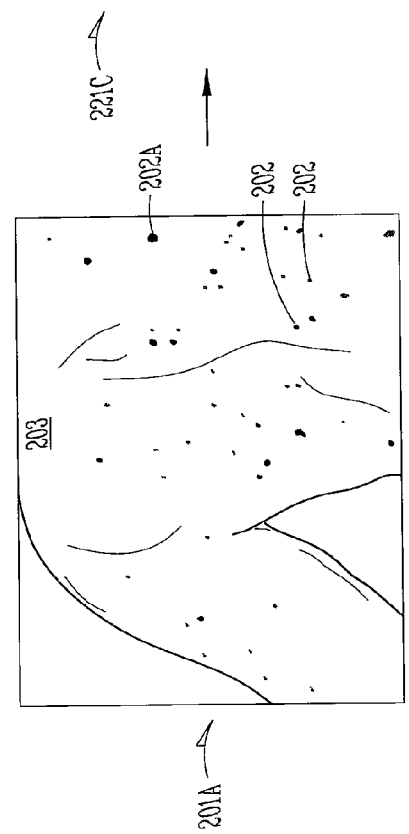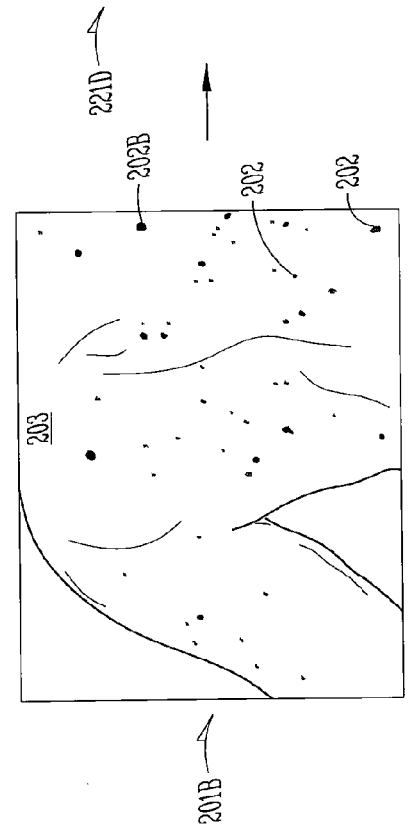

HIGH-CONFIDENCE CONSTELLATION

HIGH-CONFIDENCE CONSTELLATION

IMAGE WARPING MAP

TRANSLATIONS

US 8,554,016 B2

IMAGE REGISTRATION SYSTEM AND METHOD FOR REGISTERING IMAGES FOR DEFORMABLE SURFACES

RELATED APPLICATIONS

This application is related to U.S. patent application entitled "THREAT OBJECT MAP CREATION USING A THREE-DIMENSIONAL SPHERICITY METRIC" having Ser. No. 12/467,680, and filed May 18, 2009, which is incorporated herein by reference.

This application is also related to U.S. patent application entitled "IMAGE PROCESSING SYSTEM AND METHODS FOR ALIGNING SKIN FEATURES FOR EARLY SKIN CANCER DETECTION SYSTEMS" having Ser. No. 12/133,163, and filed Jun. 4, 2008, which is incorporated herein by reference.

TECHNICAL FIELD

Embodiments pertain to image registration for deformable surfaces. Some embodiments relate to registration of images of a human body. Some embodiments relate to the alignment of skin features, such as nevi, between two or more body images. Some embodiments relate to skin cancer detection.

BACKGROUND

The automated alignment of image features from images of deformable surfaces taken at different times is difficult because over time, a deformable surface may stretch and change shape, and in so doing, the relative positions of various surface features may change. In considering human skin as such a deformable surface, registration of images can be even more difficult due to weight gain or loss, scarring, tattoo addition or removal, and hair growth or loss; additionally, photographic features may change from image to image including such things as differences in lighting, pose and angle of the photographing.

Registration of human skin images is important for detecting skin cancer because it would automate key portions of the photographic comparison process that can take highly trained dermatologists too much time to do thoroughly. Currently, skin cancer screening is performed by combining visual observations with manual handwritten tracking methods done locally in a physician's office. Digital photography has been used by some dermatologists and patients to help identify skin changes, but it remains difficult and time-consuming to compare baseline images to lesions observed at the time of a skin examination. One means of early stage skin cancer detection is to note changes over time in the appearance of moles with respect to size and coloration. The inherent difficulties in an automated approach to imaging the human body over time, aligning features of the images, and comparing those images in a reliable and clinically useful way have not yet been overcome in any known commercial implementation.

Thus, there are needs for generalized automated image registration systems and methods for registering images of deformable surfaces in particular. There are also needs for systems and methods for precisely aligning skin features in images captured over time suitable for use in skin cancer detection.

BRIEF DESCRIPTION OF THE DRAWINGS

FIGS. 2A and 2B are examples of corresponding initial images to be registered in accordance with some embodiments;

FIGS. 2C and 2D are examples of point features generated from the corresponding initial images in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
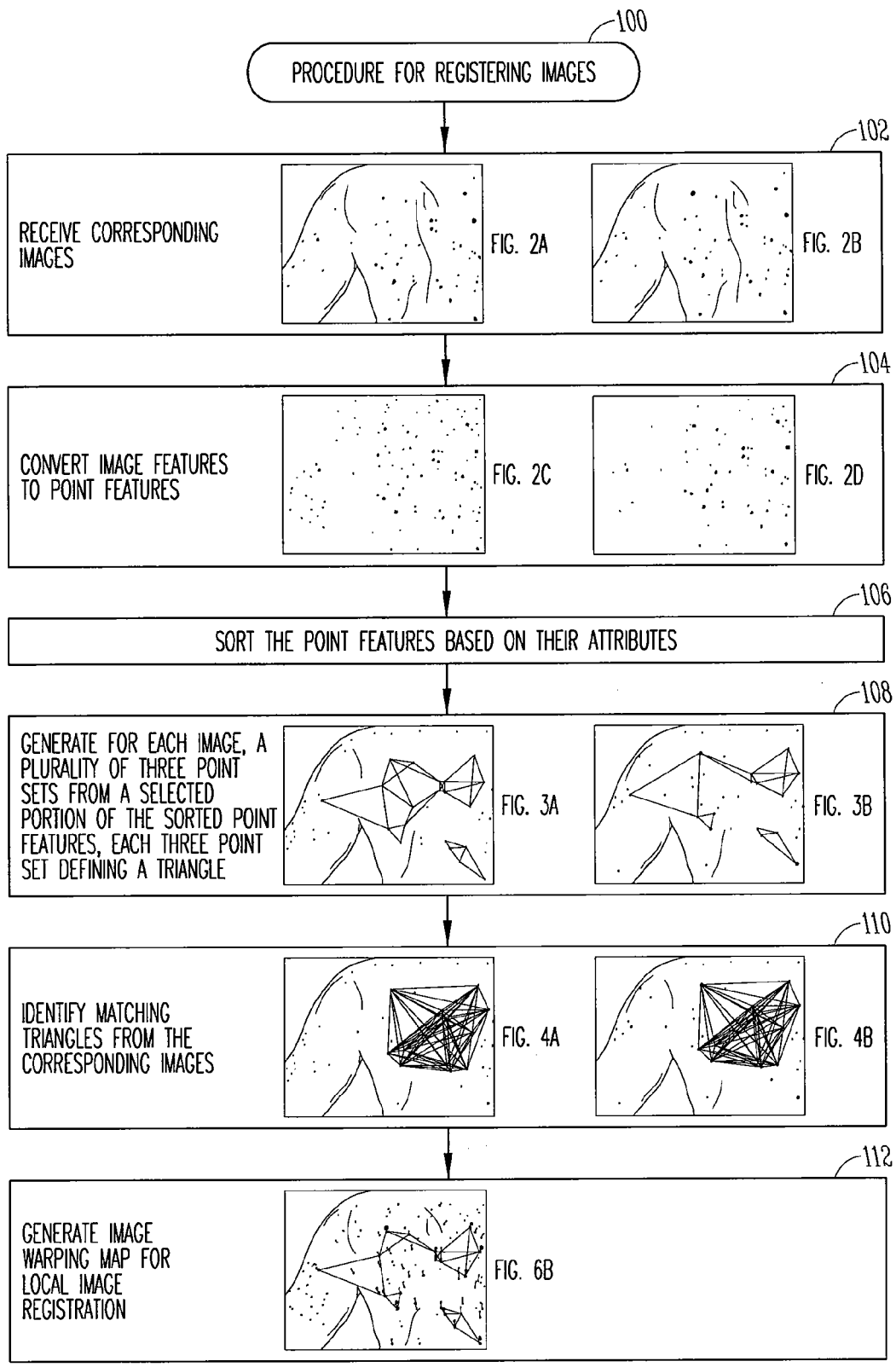
FIG. 1 is flow chart of a procedure for registering images in accordance with some embodiments.

FIG. 1 is a flow chart of a procedure for registering images in accordance with some embodiments. Procedure 100 may be used to register corresponding images of a deformable surface. The deformable surface may be a surface with consistent point-wise features. In some embodiments, procedure 100 may be used to register corresponding images of human skin and may be suitable for use in early skin cancer detection, although the scope of the embodiments is not limited in this respect.

Operation 102 comprises receiving corresponding images that are to be registered. The images may be images of a deformable surface that are taken at different times and may include image features that are to be aligned.

Operation 104 comprises converting image features of the corresponding images to point features. The point features may be identified as high-contrast regions of the images.

Operation 106 comprises sorting the point features from each corresponding image based on one or more attributes of the point features. The attributes may include contrast level and size.

Operation 108 comprises generating a plurality of three-point sets for each image from a selected portion of the sorted point features. Each three-point set defines a triangle in the image space.

Operation 110 comprises identifying matching triangles from the corresponding images. One of several triangle-matching techniques may be used. The corresponding point features of the matching triangles may represent corresponding image features.

Operation 112 comprises generating an image-warping map from the corresponding point features. The image-warping map may provide at least a local registration between the corresponding images. This may allow corresponding image features between the images to be compared.

FIGS. 2A and 2B are examples of corresponding initial images to be registered in accordance with some embodiments. Corresponding images 201A, 201B may be corresponding images of a deformable surface 203 that are taken at different times and may include a plurality of image features 202. In some embodiments, the deformable surface may be human skin. The image warping map, discussed above, provides a translation between corresponding image features 202A, 202B. In accordance with some embodiments, image features 202 of the corresponding images 201A, 201B may be converted to point features.

FIGS. 2C and 2D are examples of point features generated from the corresponding initial images in accordance with some embodiments. The point features 212 may be generated from each corresponding image 201A, 201B and may be sorted based on one or more attributes of the point features 212. In some embodiments, the point features 212 may be sorted based on an average contrast level and size of each of the point features 212. Corresponding point features 212C, 212D may be identified as part of the image registration described herein.

In some embodiments, the initial images 201A, 201B of the deformable surface 203 may be converted to corresponding binary cluster maps 221C, 221D that may comprise a plurality of clusters 222. Each cluster 222 may correspond to one of the point features 212.

In these embodiments, the initial images 201A, 201B may be converted from color images to gray-scale images, and clusters 222 may be extracted based on the contrast change between nearby pixels. Each cluster 222 may correspond to a region in one of the initial images 201A, 201B having a high change in contrast. Each cluster 222 may be selected for inclusion in one of the binary cluster maps 221C, 221D based on a change in contrast between nearby pixels (e.g., when the change in contrast between a number of pixels exceeds a threshold) and/or based on the extent (i.e., size) of the cluster. In these embodiments, clusters 222 below a predetermined size or extent may be ignored because they may be too small to be easily matched, and clusters 222 above a predetermined size may be ignored because they may be too large to be meaningfully centroided. In these embodiments, clusters that are either larger or smaller than a predetermined size range may be eliminated. Each cluster 222 may be represented, for example, by image coordinates in image space (e.g., an X-Y coordinate of the cluster's center), an average contrast level of the cluster and a cluster size (e.g., number of pixels). In some embodiments, the corresponding binary cluster maps 221C, 221D may comprise a plurality of bits in which each bit is either one or a zero to define whether a location on the cluster map is within a cluster 222 or not within a cluster.

In some embodiments, a weighting factor may be generated for each of the clusters. The weighting factor may be based on the average contrast level of the cluster 222 and the size of the cluster 222. In some embodiments, the average contrast level and the size of the cluster 222 may be multiplied together to determine the weighting factor for the cluster 222, although this is not a requirement as other weighting factors may be suitable. The clusters 222 may be sorted based on the weighting factor and the sorted clusters may be used to generate three-point sets, described in more detail below.

In some embodiments, prior to sorting the clusters 222, clusters that exceed a predetermined size may be eliminated. In these embodiments, regions of an image that may be incorrectly identified as a cluster may be excluded from the cluster maps 221C, 221D. For example, although body edges (e.g., the boundary between the region of skin depicted and the background of the image) may have a high change in contrast, body edges are not considered point features or clusters, so they are excluded from the cluster maps 221C, 221D. In embodiments in which the deformable surface 203 is human skin, body outline edges are eliminated as point features or clusters, and the point features or clusters that correspond to skin features, such as nevi, may be retained.

Figure 3A:
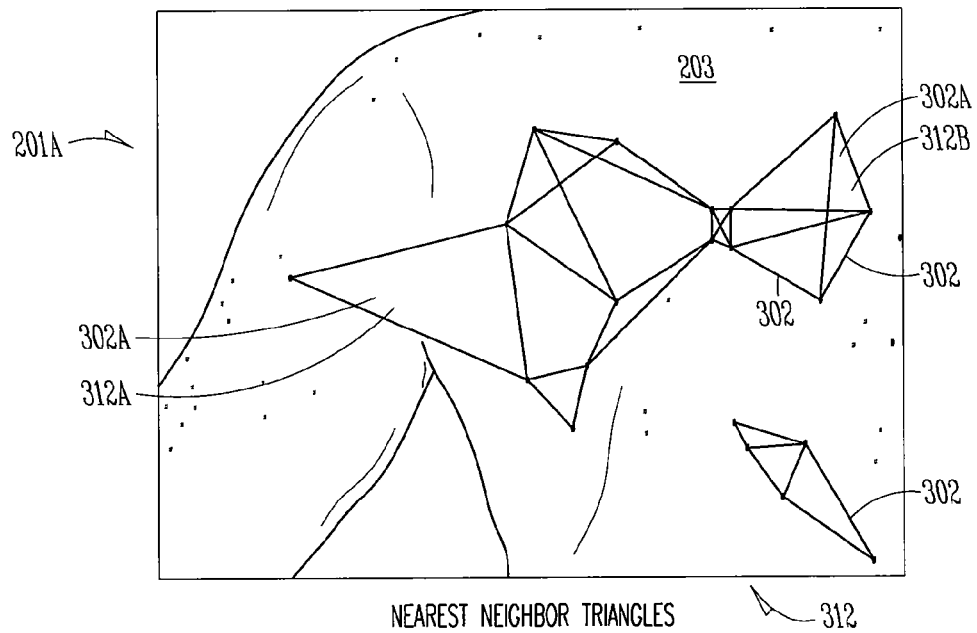
FIGS. 3A and 3B are examples of three-point sets in accordance with some embodiments.
Figure 3B:
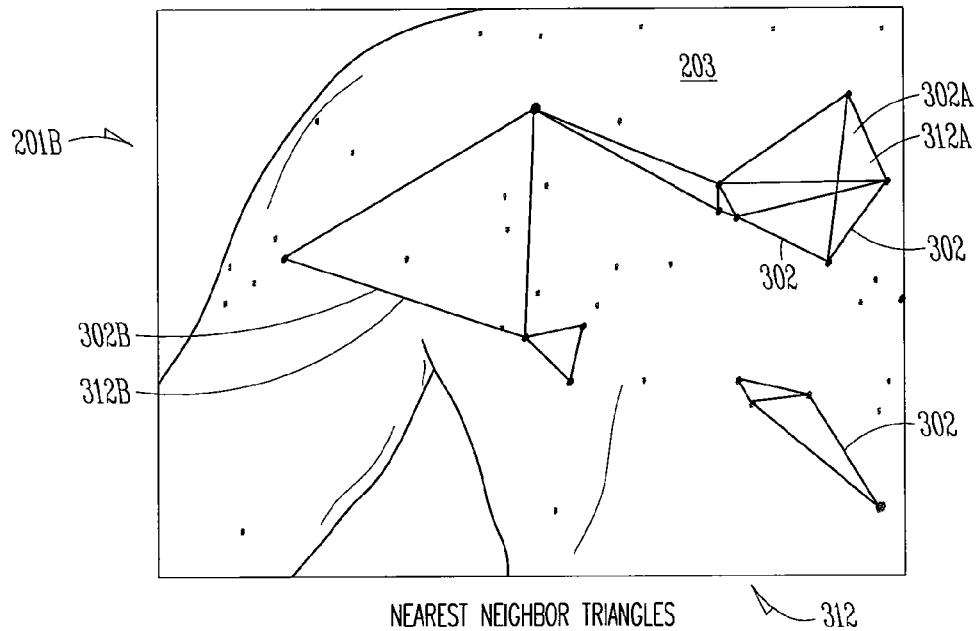

FIGS. 3A and 3B are examples of three-point sets in accordance with some embodiments. A plurality of three-point sets 302 may be generated from a selected portion of the sorted point features 212. Each three-point set 302 may define a triangle. In some embodiments, a predetermined number of the sorted point features 212 may be used to generate the three-point sets 302. In this way, many of the point features 212 can be excluded from use generating a limited number of the three-point sets 302 that define triangles. Furthermore, point features 212 with similar average contrast levels and similar size may be used to generate the three-point sets 302 that define triangles. As discussed in more detail below, matching triangles 302A, 302B may be identified from the corresponding images 201A, 201B. Corresponding point features 212C and 212D (FIGS. 2C and 2D) of the matching triangles 302A, 302B may represent corresponding image features 202A and 202B (FIGS. 2A and 2B) providing for at least a local image registration.

In some embodiments, the plurality of three-point sets 302 may be used to generate nearest-neighbor triangles 312. Matching nearest-neighbor triangles 312A, 312B from the corresponding images 201A, 201B may be identified by applying a triangle-matching algorithm.

In some embodiments, identifying the matching nearest-neighbor triangles 312A, 312B from the corresponding images 201A, 201B may include applying a sphericity algorithm to pairs of nearest-neighbor triangles 312 from the corresponding images 201A, 201B to determine the degree to which corresponding triangles match. The matching nearest-neighbor triangles 312A, 312B may include nearest-neighbor triangles 312 from the corresponding images 201A, 201B that have a sphericity above a predetermined threshold.

In some alternate embodiments, the matching nearest-neighbor triangles 312A, 312B may be identified from the corresponding images 201A, 201B by applying a weighted centroid algorithm or an inscribed circle algorithm to pairs of nearest-neighbor triangles 312 from the corresponding images to determine when a pair of nearest-neighbor triangles 312 matches.

In accordance with some embodiments, the vertices of the matching nearest-neighbor triangles 312A, 312B may correspond to corresponding point features in the images 201A, 201B, which may be used compute an image-warping map. These embodiments are described in more detail below.

In some embodiments, a constellation of high-confidence triangles may be generated to identify additional corresponding point features and to increase the confidence level of the corresponding point features identified by matching nearest-neighbor triangles.

Figure 4A:
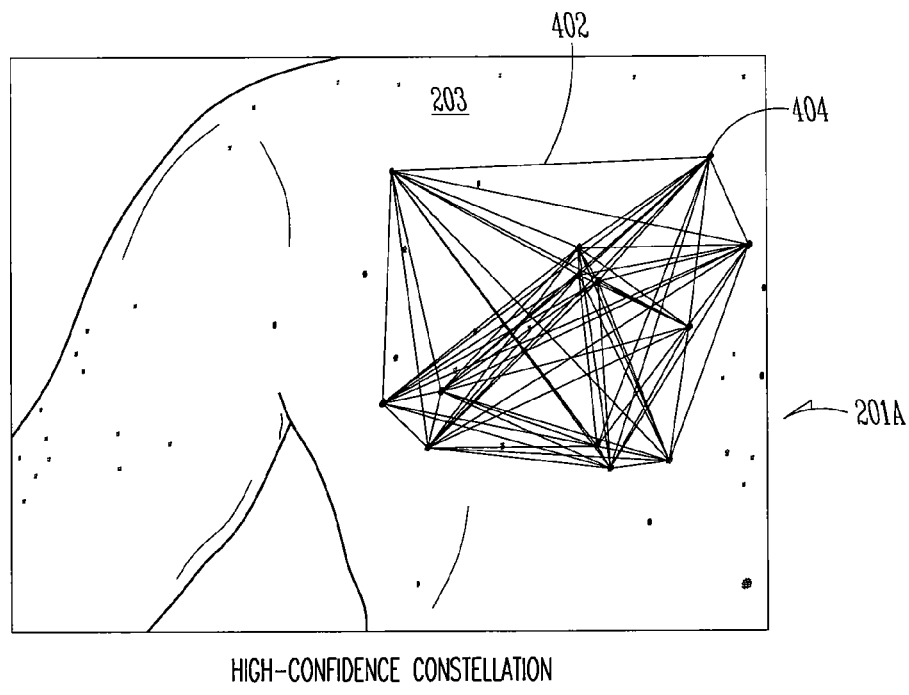
FIGS. 4A and 4B illustrate a high-confidence constellation of triangles in accordance with some embodiments.
Figure 4B:
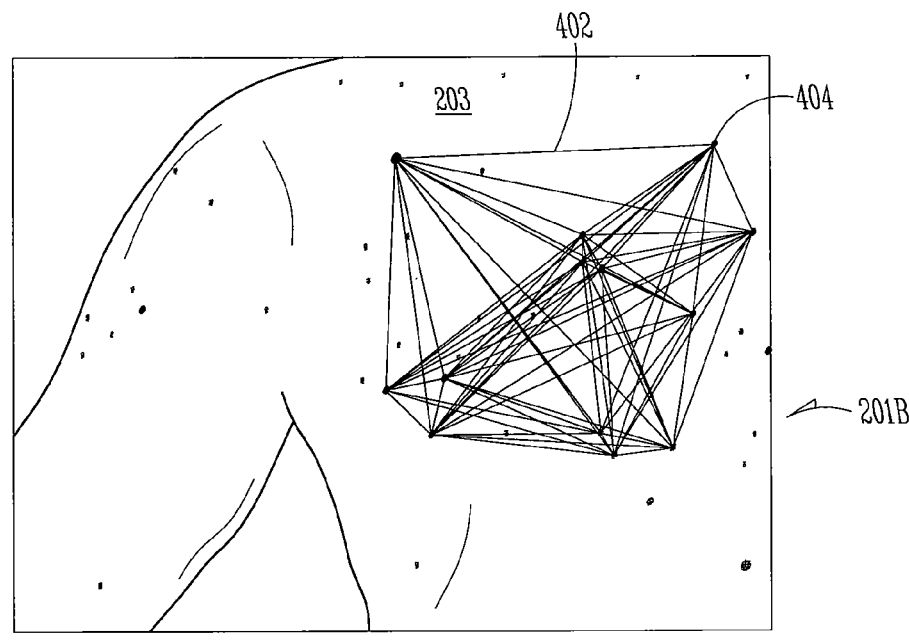

FIGS. 4A and 4B illustrate high-confidence constellations 402 of triangles in accordance with some embodiments. In these embodiments, a constellation of high-confidence triangles may be generated for each cluster map 221C, 221D (FIGS. 2C and 2D). High-confidence triangles may be added and low-confidence triangles may be eliminated. High-confidence triangles may comprise corresponding triangles generated from corresponding cluster maps of corresponding images 201A, 201B that match (e.g., have a sphericity above a predetermined threshold or are matched by some other measure), and low-confidence triangles may be triangles that do not match.

In these embodiments, the high-confidence constellations 402 of triangles may be accumulated by testing assertions of correspondence between selectively added point-features. Point features (and in some embodiments, triangles) may be added one at a time to one image, producing triangles which may be tested using a triangle-matching technique (e.g., sphericity) to determine the likelihood of a feature match with a corresponding point feature (or triangle) added in the other image. In these embodiments, each point feature (or triangle) added may result in a many triangles to measure and compare. Although each of these added triangles may be measured and compared, this is not necessary as only a few such comparisons may need to be made in order to either determine correspondence matching point features with a high degree of confidence or dismiss candidates that do not match. This process results in the generation of high-confidence constellations 402.

The vertices 404 of triangles of the high-confidence constellations 402 may be corresponding warped surface locations which may be used to compute an image-warping map. These embodiments are described in more detail below.

Figure 5:
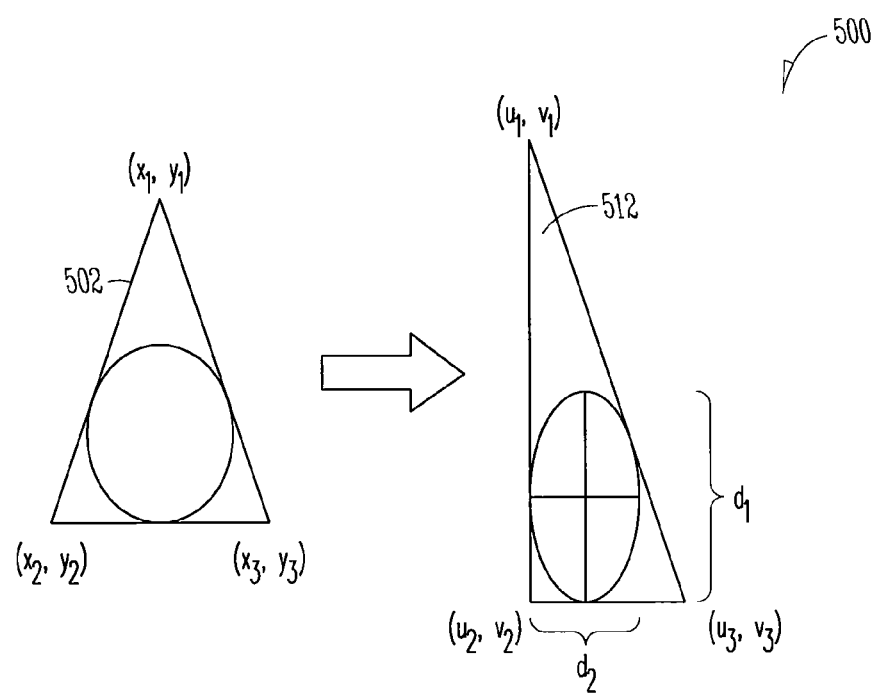
FIG. 5 illustrates the application of a sphericity algorithm to identify matching triangles in accordance with some embodiments.

FIG. 5 illustrates the application of a sphericity algorithm to identify matching triangles in accordance with some embodiments. The sphericity of triangles 502 and 512 is illustrated by equation 504. Nearest-neighbor triangles, such as matching nearest-neighbor triangles 312A, 312B (FIGS. 3A and 3B), generated from corresponding cluster maps 221C, 221D (FIGS. 2C and 2D) that have a sphericity above a predetermined threshold may be designated as matching triangles and may be used in generating the image-warping map.

In some embodiments, the sphericity algorithm may be a two-dimensional sphericity algorithm that comprises determining the similarity between pairs of the nearest-neighbor triangles 312 by inscribing a circle in a first triangle 502, translating the coordinates of the circle to a second triangle 512 to generate an ellipse inscribed in the second triangle 512, and determining the sphericity of the second triangle 512 based on lengths of the major and minor axes of the ellipse. In these embodiments, a higher sphericity results when the lengths of the major and minor axes of the ellipse are closer to unity and therefore the triangles more closely fit the mathematical definition of being similar (i.e., similar triangles have identical interior angles). In some embodiments, the sphericity may be calculated based on the following equation:

$$\text{Sphericity} = 2\frac{\sqrt{d_1 d_2}}{d_1 + d_2}$$

In this equation, $d_1$ and $d_2$ are the minor and major axes of the inscribed ellipse of the second triangle 512.

Figure 6A:
FIGS. 6A and 6B illustrate image registration in accordance with some embodiments.
Figure 6B:
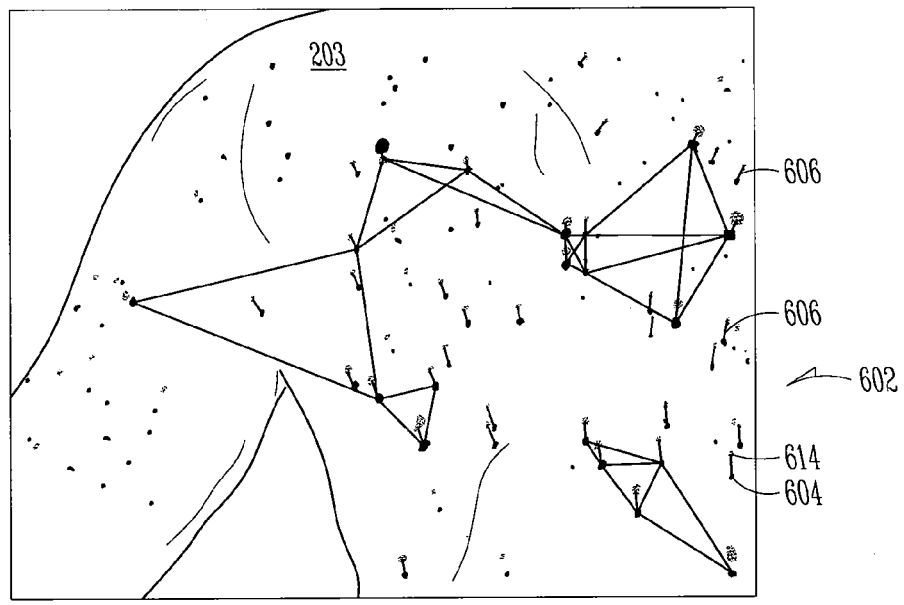

FIGS. 6A and 6B illustrate image registration in accordance with some embodiments. As discussed above, an image warping map 602 may be generated from the matching triangles 302A, 302B (FIGS. 3A and 3B). The image warping map 602 may provide a translation 606 (FIG. 6B) between corresponding image features 202A, 202B of the initial images 201A, 201B (FIGS. 2A and 2B). The image-warping map 602 may allow registration of images of the deformable surface 203.

As illustrated in FIG. 6B, the translation 606 may be a vector and may be provided for each point feature in one image to identify a corresponding point feature in the other image. In this way, a pixel-to-pixel image registration may be provided by the image warping map 602, which may be a pixel-to-pixel spatial coordinate transformation map. This pixel-to-pixel spatial coordinate transformation map may then be used to warp coordinates of the later-captured image to generate a registered image.

In some embodiments, the image warping map 602 may be applied to the images (e.g., to the binary cluster maps 221C, 221D) to identify additional corresponding point features 604, 614 that were not identified as corresponding point features by matching triangles. The additional corresponding point features 604, 614 may be added to the image-warping map 602 to generate a revised image-warping map. These additional point features 604, 614 that are added to the image warping map 602 correspond to features of the image that were not identified previously. In these embodiments, the translations 606 defined by the image-warping map 602 may be applied to a point feature in one image to identify a corresponding point feature in another image.

Figure 7:
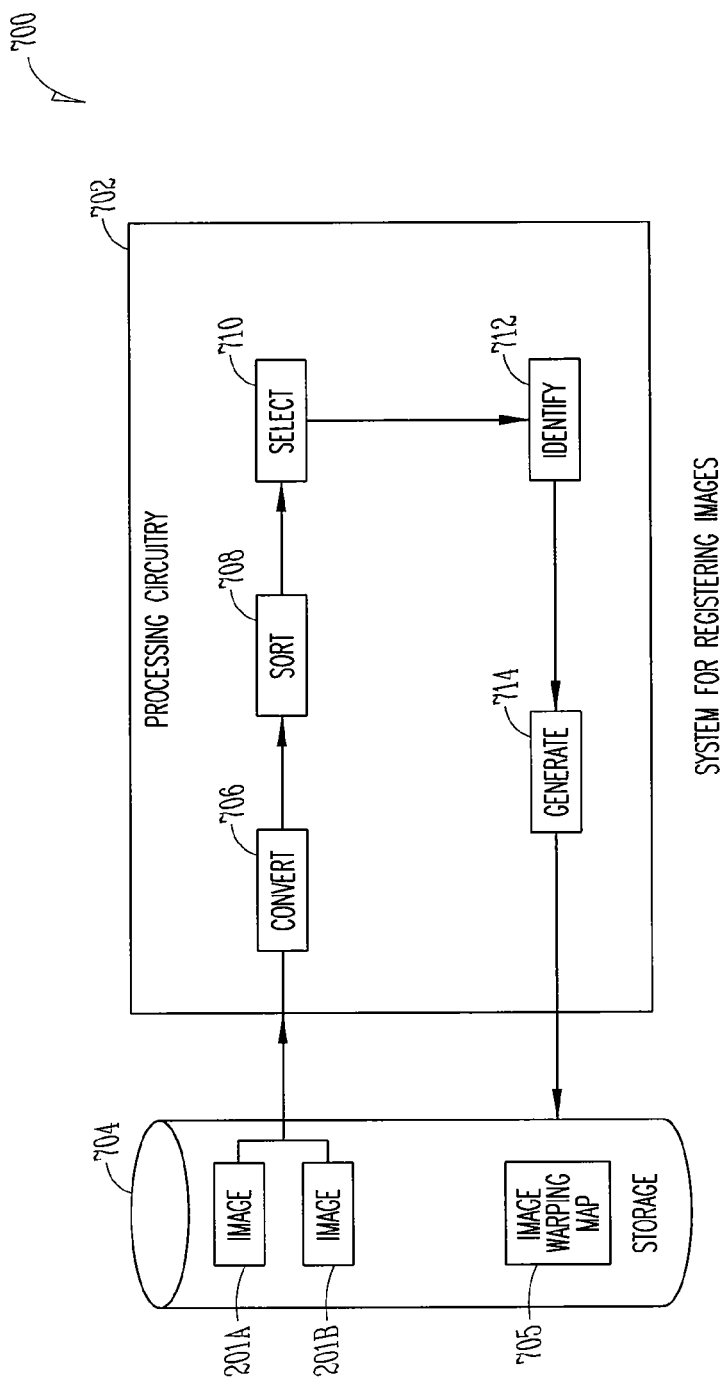
FIG. 7 illustrates a system for registering images in accordance with some embodiments.

FIG. 7 illustrates a system for registering images in accordance with some embodiments. System 700 may include storage element 704 and processing circuitry 702. Storage element 704 may store corresponding images 201A, 201B of a deformable surface 203. Processing circuitry 702 may be configured to generate an image warping map 705 that provides for registration of the corresponding images 201A, 201B. Storage element 704 may also be configured to store the image-warping map 705.

In some embodiments, the processing circuitry 702 may be configured to perform the various operations described herein for image registration. In some embodiments, the processing circuitry 702 may include circuitry to convert 706 the image features 202 (FIGS. 2A and 2B) of the corresponding images 201A, 201B to point features 212 (FIGS. 2C and 2D), and circuitry to sort 708 the point features 212 from each corresponding image 201A, 201B based on one or more attributes of the point features 212. The processing circuitry 702 may also include circuitry to select 710 a portion of the sorted point features 212, and circuitry to generate and identify 712 a plurality of three-point sets 302 from a selected portion of the sorted point features 212. As discussed above, each three-point set may define a triangle. The circuitry to generate and identify 712 may identify matching triangles 302A, 302B (FIGS. 3A and 3B) from the corresponding images 201A, 201B. The processing circuitry 702 may also include circuitry to generate 714 an image-warping map 705 based on the matching triangles. In some embodiments, the processing circuitry 702 may include one or more processors and may be configured with instructions stored on a computer-readable storage device.

Although system 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs) and combinations of various hardware and logic circuitry for performing at least the functions described herein. In some embodiments, the functional elements of system 700 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

In accordance with embodiments, the initial images 201A, 201B (FIGS. 2A and 2B) of the deformable surface 203 may comprise first and second initial corresponding images that are taken at different times. In some embodiments, the images may comprise digitized color images.

In some embodiments, the deformable surface 203 may be human skin, and the first and second initial corresponding images 201A, 201B may correspond to images taken at different times from corresponding portions of the same person. In these embodiments, the point features 212 (FIGS. 2C and 2D) may be selected, based on size and contrast, to correspond to human skin features including nevi. In some of these embodiments, skin features between two or more images may be aligned when the images may be registered to allow a physician to identify changes in the skin features between the images for early detection of skin cancer, although the scope of the embodiments is not limited in this respect. Embodiments described herein are also applicable to registration of images of a non-deformable surface.

The Abstract is provided to comply with 37 C.F.R. Section 1.72(b requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for registering corresponding images of a deformable surface, the method comprising:
converting image features of the corresponding images to point features;
sorting the point features based on one or more attributes of the point features;
generating, for each image, a plurality of three-point sets from a selected portion of the sorted point features, each three-point set defining a triangle; and
identifying matching triangles from the corresponding images by applying a sphericity algorithm to pairs of nearest-neighbor triangles from the corresponding images,
wherein matching triangles include nearest-neighbor triangles from the corresponding images that have a sphericity above a predetermined threshold, and
wherein corresponding point features of the matching triangles represent corresponding image features providing for at least local image registration.

2. The method of claim 1, wherein sorting the point features comprises sorting the point features based on an average contrast level and size of each of the point features, and
wherein the method further comprises selecting a predetermined number of the sorted point features for use in generating the three-point sets.

3. A method for registering corresponding of a deformable surface, the method comprising:
converting image features of the corresponding images to point features;
sorting the point features based on one or more attributes of the point features;
generating, for each image, a plurality of three-point sets from a selected portion of the sorted point features, each three-point set defining a triangle; and
identifying matching triangles from the corresponding images,
wherein corresponding point features of the matching triangles represent corresponding image features providing for at least local image registration,
wherein sorting the point features comprises sorting the point features based on an average contrast level and size of each of the point features,
wherein the method further comprises selecting a predetermined number of the sorted point features for use in generating the three-point sets,
wherein generating the plurality of three-point sets comprises generating nearest-neighbor triangles, and
wherein identifying matching triangles from the corresponding images comprises identifying matching nearest-neighbor triangles.

4. The method of claim 3, wherein identifying the matching triangles from the corresponding images comprises:
applying a sphericity algorithm to pairs of nearest-neighbor triangles from the corresponding images to determine when corresponding triangles match,
wherein the matching triangles include nearest-neighbor triangles from the corresponding images that have a sphericity above a predetermined threshold.

5. The method of claim 3, wherein identifying the matching triangles from the corresponding images comprises:
applying a weighted centroid algorithm or an inscribed circle algorithm to pairs of nearest-neighbor triangles from the corresponding images to determine when a pair of nearest-neighbor triangles matches.

6. The method of claim 1, wherein converting the image features of the corresponding images to point features comprises converting initial images of the deformable surface to corresponding binary cluster maps comprised of a plurality of clusters, wherein each cluster corresponds to one of the point features.

7. A method for registering corresponding of a deformable surface, the method comprising:
converting image features of the corresponding images to point features;
sorting the point features based on one or more attributes of the point features;
generating, for each image, a plurality of three-point sets from a selected portion of the sorted point features, each three-point set defining a triangle; and
identifying matching triangles from the corresponding images,
wherein corresponding point features of the matching triangles represent corresponding image features providing for at least local image registration,
wherein converting the image features of the corresponding images to point features comprises converting initial images of the deformable surface to corresponding binary cluster maps comprised of a plurality of clusters, wherein each cluster corresponds to one of the point features,
wherein each cluster corresponds to a region in one of the initial images having a high change in contrast,
wherein each cluster is selected for inclusion in one of the binary cluster maps based on a change in contrast between nearby pixels, and
wherein each cluster is represented by image coordinates of the cluster's centroid, an average contrast level of the cluster and a cluster size.

8. The method of claim 7, wherein sorting the point features comprises sorting the clusters of each of the cluster maps based on a weighting factor for each cluster,
wherein prior to sorting the clusters, the method comprises:

generating the weighting factor for each of the clusters based on the average contrast level of the cluster and the size of the cluster; and eliminating clusters that are either larger or smaller than a predetermined size range.

9. The method of claim 6, wherein the matching triangles comprise corresponding nearest-neighbor triangles generated from corresponding cluster maps that have a sphericity above a predetermined threshold, and wherein the method further comprises eliminating low-confidence triangles of the near-neighbor triangles to generate a constellation of high-confidence triangles for each cluster map.

10. The method of claim 9, wherein the sphericity is determined by a two-dimensional sphericity algorithm that comprises determining a similarity of pairs of the nearest-neighbor triangles of the cluster maps by:

inscribing a circle in a first triangle;

translating coordinates of the circle to a second triangle to generate an ellipse inscribed in the second triangle; and determining the sphericity of the second triangle based on lengths of major and minor axes of the inscribed ellipse.

11. The method of claim 9, further comprising:

generating a constellation of high-confidence triangles from candidate corresponding clusters of the cluster maps by testing assertions of corresponding triangles; and based on the tested assertions, either retaining or eliminating corresponding triangles from the constellation to generate a high-confidence constellation, wherein vertices of triangles of the high-confidence constellation correspond to corresponding image locations.

12. The method of claim 1, further comprising generating an image warping map from vertices of the matching triangles, the image warping map to provide a translation between corresponding point features of the corresponding images, the image warping map to allow registration of images of the deformable surface.

13. The method of claim 12, further comprising:

applying the image warping map to the images to identify additional corresponding point features that were not identified as corresponding point features by matching triangles; and adding the additional corresponding point features to the image-warping map to generate a revised image-warping map.

14. The method of claim 12, wherein the deformable surface is human skin, wherein the corresponding images are images taken at different times from corresponding portions of a human, and wherein the point features are selected to correspond to human skin features including nevi.

15. An image-registration system for registering corresponding images of a deformable surface, the system comprising one or more processors configured to:

receive a pair of corresponding images;

convert image features of the corresponding images to point features;

sort the point features based on one or more attributes of the point features;

generate, for each image, a plurality of three-point sets from a selected portion of the sorted point features, each three-point set defining a triangle; and identify matching triangles from the corresponding images by applying a sphericity algorithm to pairs of nearest-neighbor triangles from the corresponding images, wherein matching triangles include nearest-neighbor triangles from the corresponding images that have a sphericity above a predetermined threshold, and wherein corresponding point features of the matching triangles represent corresponding image features providing for at least local image registration.

16. The system of claim 15, further comprising a computer-readable storage device configured to store the pair of corresponding images and to store an image-warping map, wherein the one or more processors are configured to:

sort the point features based on an average contrast level and size of each of the point features; and select a predetermined number of the sorted point features for use in generating the three-point sets.

17. An image-registration system for registering corresponding images of a deformable surface, the system comprising computer-readable storage device and one or more processors configured to:

receive a pair of corresponding images;

convert image features of the corresponding images to point features;

sort the point features based on one or more attributes of the point features;

generate, for each image, a plurality of three-point sets from a selected portion of the sorted point features, each three-point set defining a triangle; and identify matching triangles from the corresponding images, wherein corresponding point features of the matching triangles represent corresponding image features providing for at least local image registration, wherein the computer-readable storage device is configured to store the pair of corresponding images and to store an image-warping map, wherein the one or more processors are configured to:

sort the point features based on an average contrast level and size of each of the point features; and select a predetermined number of the sorted point features for use in generating the three-point sets, wherein the plurality of three-point sets comprise nearest-neighbor triangles, wherein matching nearest-neighbor triangles are identified by application of a sphericity algorithm to pairs of nearest-neighbor triangles from the corresponding images, and wherein the matching triangles include nearest-neighbor triangles from the corresponding images that have a sphericity above a predetermined threshold.

18. The system of claim 17, wherein the one or more processors are further configured to generate the image warping map from vertices of the matching triangles, the image warping map to provide a translation between corresponding point features of the corresponding images, the image warping map to allow registration of images of the deformable surface.

19. A method for registering images of a deformable surface, the method comprising:

converting initial images of the deformable surface to corresponding binary cluster maps, each cluster map having a plurality of clusters;

sorting the clusters of each of the cluster maps based on an average contrast level and size of the clusters;

selecting a predetermined number of the sorted clusters to generate nearest-neighbor triangles based on locations the selected clusters;

identifying matching triangles from the nearest-neighbor triangles by applying a sphericity algorithm to pairs of nearest-neighbor triangles of the corresponding cluster maps, the matching triangles comprising high-confidence matching triangles from each cluster map that have a sphericity above a predetermined threshold; and generating an image-warping map from corresponding clusters of the high-confidence matching triangles, the image-warping map to provide a translation between the corresponding clusters in the cluster maps for at least a local image registration.

20. The method of claim 19, wherein the deformable surface is human skin, wherein the initial images are images taken at different times from corresponding portions of a human, and wherein the clusters are selected to correspond to human skin features including nevi.

21. The method of claim 20, wherein prior to sorting the clusters, the method comprises:

generating a weighting factor for each of the clusters based on the average contrast level and the size of the cluster; and eliminating clusters that are either larger or smaller than a predetermined size range.

22. The method of claim 21, wherein the sphericity is determined by a two-dimensional sphericity algorithm that comprises determining a similarity of pairs of the nearest-neighbor triangles of the cluster maps by:

inscribing a circle in a first triangle;

translating coordinates of the circle to a second triangle to generate an ellipse inscribed in the second triangle; and determining the sphericity of the second triangle based on lengths of major and minor axes of the inscribed ellipse.

23. A non-transitory computer-readable storage device that stores instructions for execution by one or more processors to perform operations to register initial images, the instructions to configure the one or more processors to:

convert the initial images of a deformable surface to corresponding binary cluster maps, each cluster map having a plurality of clusters;

sort the clusters of each of the cluster maps based on an average contrast level and size of the clusters;

select a predetermined number of the sorted clusters to generate nearest-neighbor triangles based on locations the selected clusters;

identify matching triangles from the nearest-neighbor triangles by applying a sphericity algorithm to pairs of nearest-neighbor triangles of the corresponding cluster maps, the matching triangles comprising triangles from each cluster map that have a sphericity above a predetermined threshold; and generate an image-warping map from corresponding clusters of the high-confidence matching triangles, the image-warping map to provide a translation between the corresponding clusters in the cluster maps for at least a local image registration.

* * * * *

UNITED STATES PATENT AND TRADEMARK OFFICE
CERTIFICATE OF CORRECTION

PATENT NO. : 8,554,016 B2
APPLICATION NO. : 12/943156
DATED : October 8, 2013
INVENTOR(S) : Steven James Manson It is certified that error appears in the above-identified patent and that said Letters Patent is hereby corrected as shown below:

On the Title page, in column 2, under "Other Publications", line 1, before "U.S.", insert --"--, therefor On the Title page, in column 2, under "Other Publications", line 2, delete "2008," and insert --2008",--, therefor On Title page 2, in column 1, under "Other Publications", line 1, before "International", insert --"--, therefor On Title page 2, in column 1, under "Other Publications", line 2, delete "2009," and insert --2009",--, therefor On Title page 2, in column 1, under "Other Publications", line 3, before "International", insert --"--, therefor On Title page 2, in column 1, under "Other Publications", line 4, delete "2009," and insert --2009",--, therefor On Title page 2, in column 2, under "Other Publications", line 1, before "International", insert --"--, therefor On Title page 2, in column 2, under "Other Publications", line 2, delete "2009," and insert --2009",--, therefor On Title page 2, in column 2, under "Other Publications", line 3, before "International", insert --"--, therefor On Title page 2, in column 2, under "Other Publications", line 4, delete "2009," and insert --2009",--, therefor Signed and Sealed this
Eleventh Day of February, 2014

Michelle K. Lee
*Deputy Director of the United States Patent and Trademark Office*

CERTIFICATE OF CORRECTION (continued)
U.S. Pat. No. 8,554,016 B2

On Title page 2, in column 2, under "Other Publications", line 5, before "U.S.", insert --"--, therefor On Title page 2, in column 2, under "Other Publications", line 5, delete "12/133,163" and insert --12/133,163,--, therefor On Title page 2, in column 2, under "Other Publications", line 5, delete "Aliowance maiied" and insert --Allowance mailed--, therefor On Title page 2, in column 2, under "Other Publications", line 5, delete "2012," and insert --2012",--, therefor On Title page 2, in column 2, under "Other Publications", line 7, before "U.S.", insert --"--, therefor On Title page 2, in column 2, under "Other Publications", line 8, delete "2011," and insert --2011",--, therefor On Title page 2, in column 2, under "Other Publications", line 9, before "U.S.", insert --"--, therefor On Title page 2, in column 2, under "Other Publications", line 10, delete "2011," and insert --2011",--, therefor On Title page 2, in column 2, under "Other Publications", line 11, before "International", insert --"--, therefor On Title page 2, in column 2, under "Other Publications", line 12, delete "2012," and insert --2012",--, therefor On Title page 2, in column 2, under "Other Publications", line 13, before "International", insert --"--, therefor On Title page 2, in column 2, under "Other Publications", line 14, delete "2012," and insert --2012",--, therefor In the Specification:

In column 7, line 23, delete "(b" and insert --(b)--, therefor

In the Claims:

In column 7, line 57, in claim 3, after "corresponding", insert --images--, therefor In column 8, line 36, in claim 7, after "corresponding", insert --images--, therefor